(12) United States Patent
Oh (10) Patent No.: US 12,100,334 B1
(45) Date of Patent: Sep. 24, 2024

(54) ADJUSTABLE LIGHT EMITTING HALO FOR DISPLAY BIAS LIGHTING

(71) Applicant: Dell Products, L.P., Round Rock, TX (US)

(72) Inventor: Guentaek Oh, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/298,809

(22) Filed: Apr. 11, 2023

(51) Int. Cl.
*H01J 9/24* (2006.01)
*G02F 1/00* (2006.01)
*G02F 1/1335* (2006.01)
*G02F 1/167* (2019.01)
*G09G 3/20* (2006.01)

(52) U.S. Cl.
CPC ......... *G09G 3/2092* (2013.01); *G02F 1/0063* (2013.01); *G09G 2310/0237* (2013.01); *G09G 2320/062* (2013.01); *G09G 2360/144* (2013.01)

(58) Field of Classification Search
CPC .............................................. G02B 2027/014
See application file for complete search history.

(56) References Cited

U.S. PATENT DOCUMENTS

| 6,007,209 A | * | 12/1999 | Pelka | G02F 1/133603 362/97.3 |
| 2012/0206939 A1 | * | 8/2012 | Yasukawa | G02B 6/0065 445/24 |
| 2015/0003104 A1 | * | 1/2015 | Huang | G02B 6/005 362/613 |
| 2018/0031943 A1 | * | 2/2018 | Yamazaki | G02F 1/1677 |

\* cited by examiner

*Primary Examiner* — Nan-Ying Yang
(74) *Attorney, Agent, or Firm* — Fogarty LLP (57) ABSTRACT

An external display may support bias lighting via lights located on the rear of the display. Embodiments provide a baffle connected to the rear of the display such that the baffle redirects light output from the rear-facing bias lights. According to one embodiment, a display for presenting information generated by an Information Handling System (IHS) includes a screen disposed on a front side of the display, one or more bias lights disposed on a rear side of the display, a baffle comprising a baffle surface, the baffle coupled to the rear side of the display, and a selectively reflective layer disposed on the baffle surface, wherein the selectively reflective layer has a reflectivity that is changeable to selectively reflect a varying amount of light outputted from the bias lights.

17 Claims, 8 Drawing Sheets

ADJUSTABLE LIGHT EMITTING HALO FOR DISPLAY BIAS LIGHTING

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may utilize a wide variety of displays. Certain IHSs, such as portable IHSs, utilize integrated displays. Some IHSs may also support the use of external displays. In some scenarios, IHSs may be coupled to television sets, such that the television is utilized as an external display of the IHS. Some displays that may be coupled to an IHS, including television sets, may support the use of bias lighting via one or more light sources that are located on the back of the display and are operated to illuminate surfaces or objects that are behind the display. Bias lighting may be used to improve the user's perception of the output of the display, to reduce eyestrain and/or as decorative lighting.

SUMMARY

An external display may support bias lighting via lights located on the rear of the display. Embodiments provide a baffle connected to the rear of the display such that the baffle redirects light output from the rear-facing bias lights. According to one embodiment, a display for presenting information generated by an Information Handling System (IHS) includes a screen disposed on a front side of the display, one or more bias lights disposed on a rear side of the display, a baffle comprising a baffle surface, the baffle coupled to the rear side of the display, and a selectively reflective layer disposed on the baffle surface, wherein the selectively reflective layer has a reflectivity that is changeable to selectively reflect a varying amount of light outputted from the bias lights.

According to another embodiment, an adjustable light emitting halo system for display bias lighting includes a processing device comprising one or more processors and one or more memory units including instructions that, upon execution by the processors, cause an Information Handling System (IHS) to receive a signal indicating an amount of ambient light around a display comprising a screen disposed on a front side of the display, one or more bias lights disposed on a rear side of the display, and a baffle comprising a baffle surface and coupled to the rear side of the display. The adjustable light emitting halo system also causes the IHS to control a selectively reflective layer disposed on the baffle surface to selectively vary a reflectivity of the selectively reflective layer based upon the received signal.

According to yet another embodiment, an adjustable light emitting halo method includes the steps of receiving a signal indicating an amount of ambient light around a display, and controlling a selectively reflective layer disposed on a baffle surface to selectively vary a reflectivity of the selectively reflective layer based upon the received signal. The display includes a screen disposed on a front side of the display, one or more bias lights disposed on a rear side of the display, and a baffle comprising the baffle surface and coupled to the rear side of the display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 3A-4C illustrate how the display of FIGS. 2A-2C may selectively adjust the amount of light reflected from the bias lights according to one embodiment of the present disclosure.

DETAILED DESCRIPTION

Embodiments of the present disclosure provide systems and methods to implement a switchable reflector on halo displays that may, in many cases, provide for expanded user experience. Halo displays can be used for gaming and watching movies in low light conditions. Many halo displays are configured with bias lights that emit light behind the display, which may be reflected from the environment (e.g., wall, doors, furniture, etc.) behind the display for providing an enhanced immersive experience for the user. Certain halo displays may be configured with a baffle that is configured on the display to aid in reflecting the light emitted by the bias lights. One example of such a halo display includes an adjustable halo for display bias lighting, which is described in U.S. Pat. No. 10,670,234, filed on May 4, 2020, and incorporated by reference in its entirety.

According to embodiments of the present disclosure, a selectively reflective layer may be configured on the surface of the baffle to control the amount of light that is reflected from the bias lights. To maximize the halo effect, such as during low-light conditions, a white surface may be used to enhance reflection of the generated light. The light reflected from a white surface, however, may not be well-suited for use during normal lighting conditions. As will be described in detail herein below, a system and method for adjustable light emitting halo for display bias lighting may be provided in which the surface of the baffle may be provided with a selectively reflective layer that is adjusted to selectively adjust how much bias light is reflected from the bias lights of halo displays. Additionally, the bias display may be configured with an ambient light sensor to automatically adjust the amount of bias light reflected based upon ambient light conditions where the bias display is being used.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
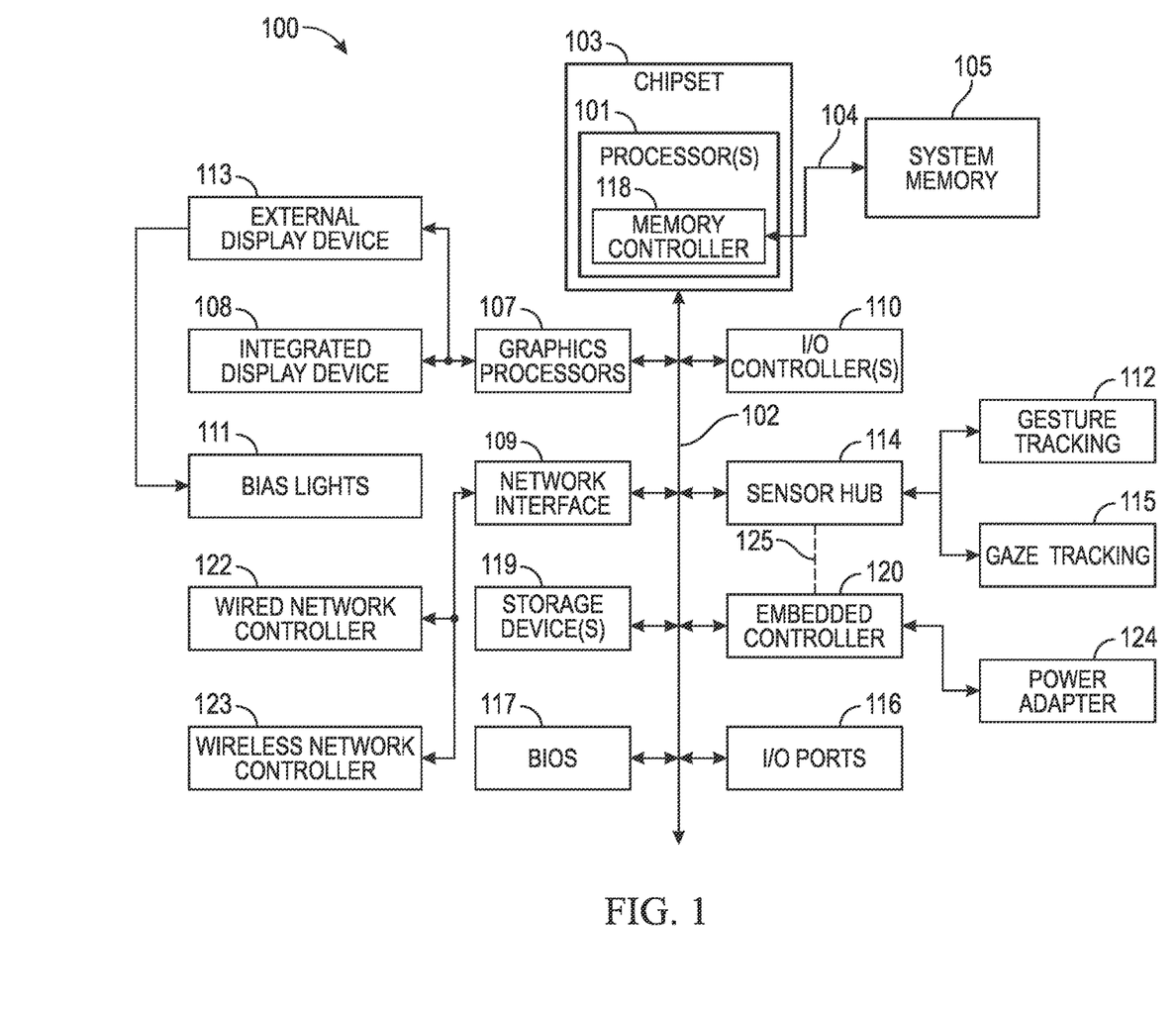
FIG. 1 is a block diagram depicting certain components of an IHS operable according to various embodiments for use with a display that utilizes an adjustable halo for bias lighting.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device utilizing an external display, other embodiments may be utilized.

FIG. 1 is a block diagram illustrating certain components of an IHS 100 configured according to certain embodiments for use with a display that utilizes an adjustable halo for redirection of bias lighting. While a single IHS 100 is illustrated in FIG. 1, IHS 100 may be a component of an enterprise system that may include any number of additional IHSs that may also be configured in the same or similar manner to IHS 100. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controller 122 and wireless network controller 123. Each network controller 122, 123 may be coupled via various buses to the chipset 103 of IHS 100 in supporting different types of network connectivity, such as the network connectivity utilized in the operation of applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or via capabilities of graphics processor 107, or via a separate microcontroller of IHS 100 that is accessed via bus 102. In some embodiments, IHS 100 may support an integrated display device 108, such as a display integrated into a laptop, tablet, 2-in-1 convertible device, or mobile device.

As described, an IHS 100 may support use of one or more external displays 113, such as external display monitors that may be coupled to IHS 100 via various types of wired and wireless couplings. In addition to supporting couplings to external displays 113 that are designed for use as external monitors for personal computing devices, in certain instances, an IHS 100 may be coupled to a television set for use as an external display 113. As illustrated, IHS 100 includes support for one or more bias lights 111 that may be supported by an external display device 113. In certain embodiments, the operation of bias lights 111 may be configured by the user via software applications that are supported by the operating system of IHS 100. In certain embodiments, the operation of bias lights 111 may be configured via applications executing within a secure execution environment of embedded controller 120. As described in additional detail with regard to FIGS. 3A-C, embodiments support the configuration of external displays that include a baffle, such as a halo that surrounds the perimeter of the display, that distributes the light output of the bias lights 111 of IHS 100. In certain embodiments, a baffle such as a halo may be adjustable such that the light output of bias lights 111 may be adjusted according to user preferences. In such embodiments, the software applications of IHS 100 may support the configuration of bias lights 111 in a manner that accounts for the position in which the halo is currently adjusted.

In various embodiments, IHS 100 may include one or more I/O ports 116 that may support removable couplings with various types of external devices and systems, including removable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100. In certain embodiments, chipset 103 may additionally utilize one or more I/O controllers 110 that may each support the operation of hardware components such as user I/O devices that are physically coupled to an I/O port 116 and/or peripheral components that are wirelessly coupled to IHS 100 via a network interface 109. In various embodiments, I/O controller 110 may support the operation of one or more user I/O devices such as a keyboard, mouse, touchpad, touchscreen, microphone, speakers, camera and other input and output devices that may be coupled to IHS 100.

Certain IHS 100 embodiments may utilize a sensor hub 114 capable of tracking certain aspects of a user of IHS 100, as well as tracking the relative orientation and movement of IHS 100. For instance, sensor hub 114 may utilize inertial movement sensors, that may include accelerometer, gyroscope and magnetometer sensors and are capable of determining the current orientation and movement of IHS 100 (e.g., IHS 100 is motionless on a relatively flat surface or IHS 100 is being moved irregularly and is likely in transport or in mobile use). In certain embodiments, sensor hub 114 may also include capabilities for determining a location and movement of IHS 100 based on triangulation of network signal information and/or based on information accessible via the operating system or a location subsystem, such as a GPS module. In some embodiments, sensor hub 114 may support a gesture tracking sensor 112, a gaze tracking sensor 115, or other sensors, such as optical, infrared and sonar sensors, that may provide support for xR (virtual, augmented, mixed reality) sessions hosted by the IHS 100 and may be used by sensor hub 114 to provide an indication of a user's presence near IHS 100.

In certain embodiments, sensor hub 114 may be an independent microcontroller or other logic unit that is coupled to the motherboard of IHS 100. In certain embodiments, sensor hub 114 may be a component of an integrated system-on-chip incorporated into processor 101. In some embodiments, sensor hub 114 may communicate with chipset 103 of processor 101 via a bus connection such as an Inter-Integrated Circuit (I2C) bus 125 or other suitable type of bus connection. Sensor hub 114 may also utilize an I2C bus 125 for communicating with various sensors supported by IHS 100.

IHS 100 embodiments may also utilize an embedded controller 120 that may be a motherboard component of IHS 100 and may include one or more logic units. In certain embodiments, embedded controller 120 may operate from a separate power plane from the main processors 101 and thus the operating system functions of IHS 100. Embedded controller 120 may implement operations for interfacing with a power adapter 124 in managing power for IHS 100. Such operations may be utilized to determine the power status of IHS 100, such as whether IHS 100 is operating from battery power or is plugged into an AC power source. Firmware instructions utilized by embedded controller 120 may be used to operate a secure execution environment that may include operations for providing various core functions of IHS 100, such as power management, management of operating modes in which IHS 100 may be physically configured and support for certain integrated I/O functions. As described, IHS 100 may utilize an external display 113 that supports bias lighting 111 output via an adjustable halo. In certain embodiments, the operations of the secure execution environment of embedded controller 120 may include operations for interfacing with sensors that providing the current position in which a bias lighting baffle of an external display, such as the halo described with regard to FIGS. 3A-C, has been adjusted.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

In certain embodiments, IHS 100 may utilize a BIOS (Basic Input/Output System) 117 that may be stored in a non-volatile memory accessible by chipset 103 via bus 102. Upon powering or restarting IHS 100, processor(s) 101 may utilize BIOS instructions to initialize and test hardware components coupled to the IHS 100. The BIOS instructions may also load an operating system for use by the IHS 100. The BIOS provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
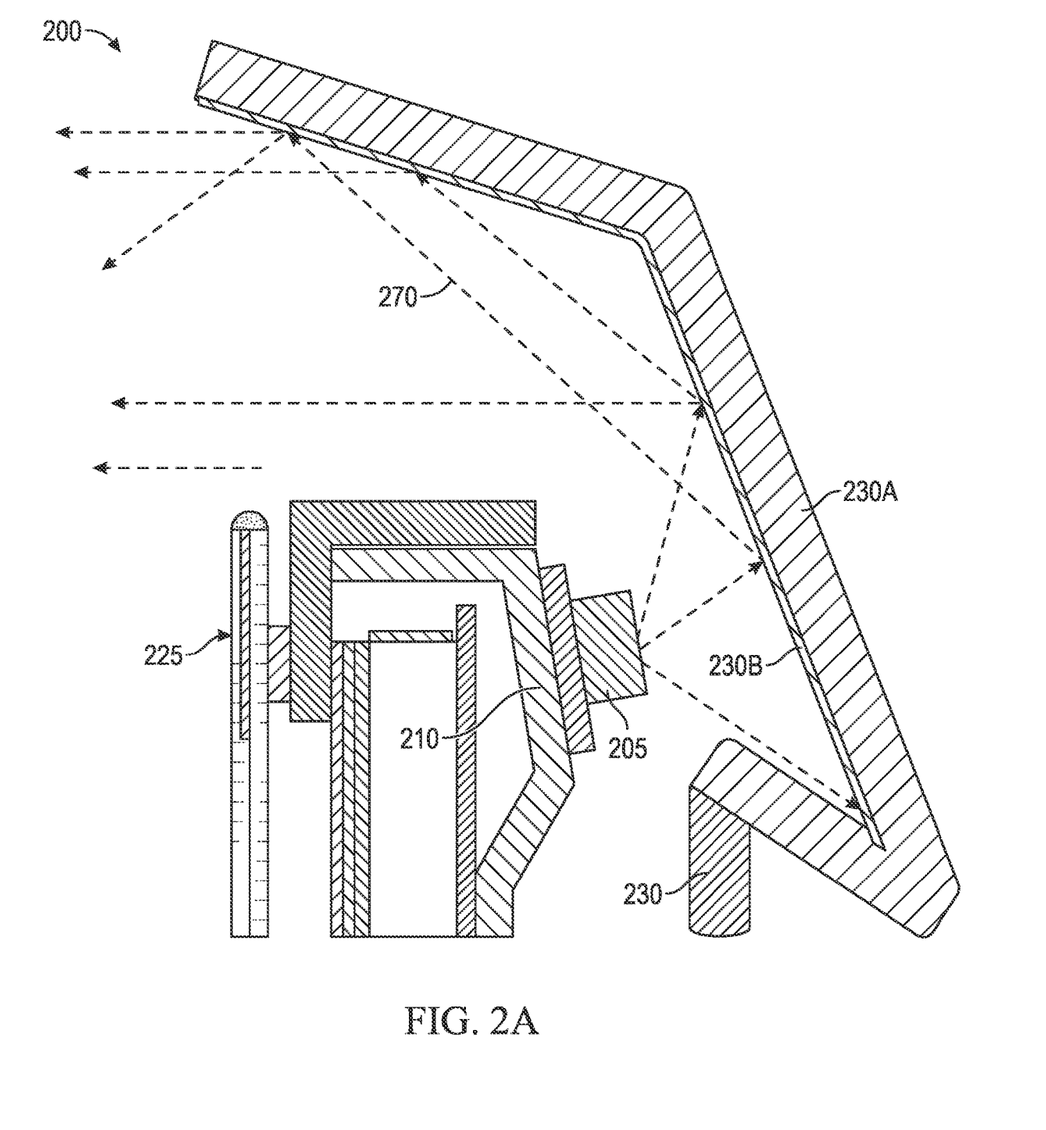
FIG. 2A is a cut-away illustration of bias lighting in operation in a portion of a display according to embodiments that supports adjustable bias lighting via adjustment of a halo.

FIG. 2A is a cut-away illustration of bias lighting in operation within a portion of a display 200 that supports, according to various embodiments, adjustable bias lighting via configuration of a halo-type baffle. In the illustrated embodiment, the output of screen 225 is projected towards a user facing the display 200 and bias lighting 270 is generated via rear-facing bias lights 205. However, as illustrated, the output 270 of bias light 205 is directed towards the user via a halo portion 230a of rear cover 230, where the halo serves as a baffle that redirects the light output 270 of bias light 205. In various embodiments, the halo portion 230a of the rear cover 230 may be a multi-segment baffle designed to for capturing and reflecting the full output 270 of bias light 205 towards a user facing screen 225.

In certain embodiments, some of the segments of a multi-segment baffle may be joined in a manner that allows these segments to be rotated relative to each other, thus allowing the shape of the baffle to be manually adjusted. In various embodiments, a halo 230a may be constructed using any number of segments that support redirection of the output of bias light 205. In certain embodiments, the halo 230a may be a single-segment baffle that may be a straight segment, a curved shape, or any other suitable shape for redirecting the output of a bias light 205. In various embodiments, multiple bias lights similar to bias light 205 may be located along the edges of display 200 with the output of these bias lights directed towards a user via a halo 230a that extends from the rear cover 230 along one or more of the four edges of the display 200.

Through design of the halo 230a in this manner, a greater portion of the output of bias light 205 may be directed towards the user when compared to conventional bias displays that do not possess a halo 230 in which the output is reflected off of a surface of unknown composition and located at an unknown distance from the rear of the display. Additionally, in conventional bias lighting schemes, a portion of the output of bias light is often deflected further behind the display rather than outward, thus resulting in wasted output of bias light. Accordingly, through the use of halo 230a, bias lighting may be provided more efficiently than in conventional implementations.

According to embodiments of the present disclosure, a selectively reflective layer 230b may be disposed on a surface of the halo 230a to control an amount of bias light reflected towards the user. Additional details about how the selectively reflective layer 230b may be used to control the amount of bias light will be described in detail herein below.

Figure 2B:
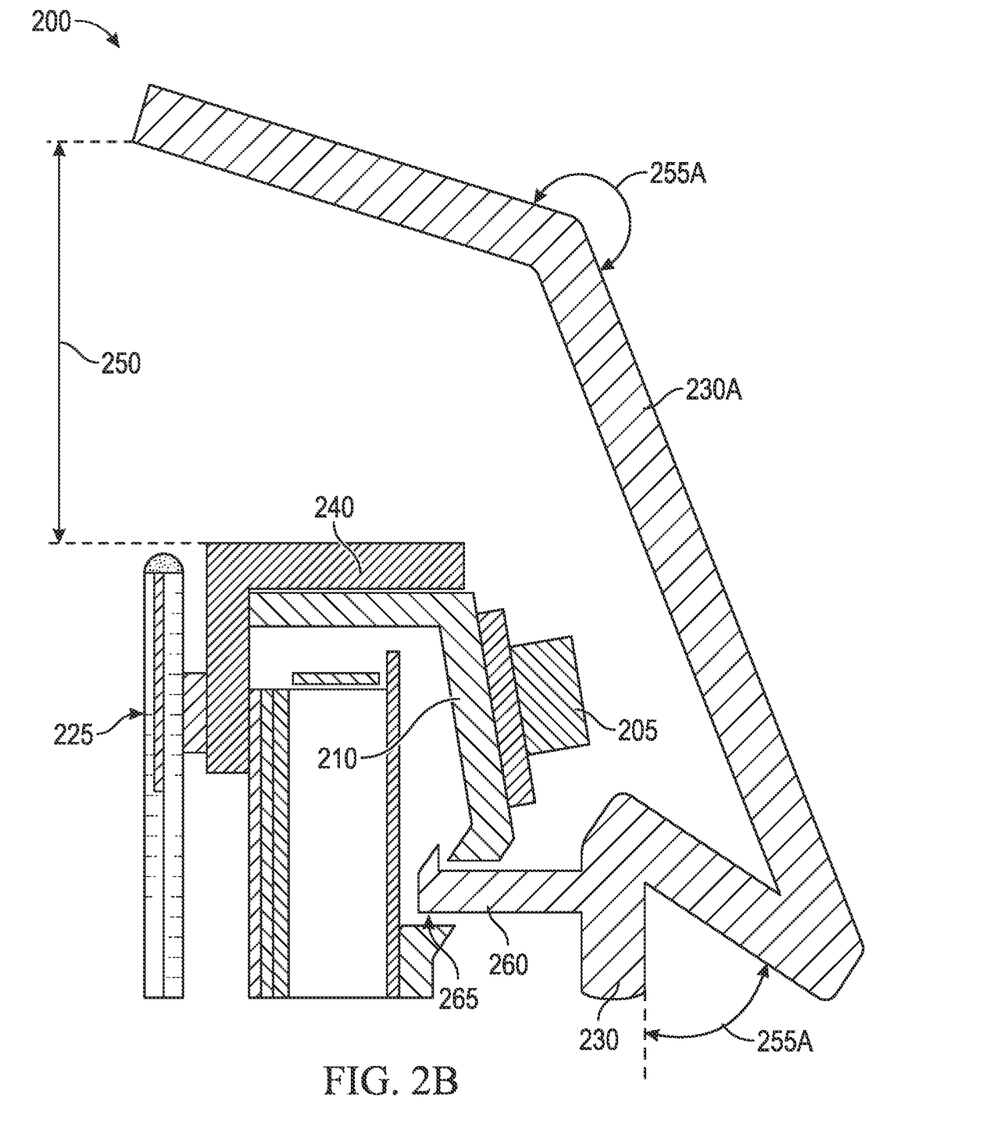
FIG. 2B is a cut-away illustration of a portion of a display that supports adjustable bias lighting via adjustment of a halo according to embodiments, where the halo is adjusted in an open position.

Another embodiment illustrated in FIG. 2A includes the attachment of the bias light 205 directly to the inner cover 210. Conventional bias light implementations often cannot be fixed to the inner cover 210 due to screws that affix its frame to its inner cover. As illustrated in FIG. 2A, no frame is utilized to attach the rear cover 230 to the inner cover 210. Instead, as illustrated in FIG. 2B, the rear cover 230 may be fixed directly to the rear cover 210 at a location that allows the bias light 205 to be fixed directly to the inner cover 210 and positioned along the edge of the display 200. By fixing the bias light 205 directly to the inner cover 210, heat generated by bias light 205 may be dissipated via the inner cover 210, which may be designed as a heat sink or as a conduit to a heat sink for internal components of the display 200. Also as illustrated in FIG. 2B, the portion of the inner cover 210 to which the bias light 205 is fixed may be designed such that the bias light is tilted towards the edge of the display, thus further improving the ability to capture and direct the full output 270 of bias light 205 towards the user facing the screen 225.

FIG. 2B is a cut-away illustration of a portion of a display 200 that supports adjustable bias lighting via configuration of a halo-type baffle according to embodiments, where the halo is configured in an open position. As described with regard to FIG. 2A, rear cover 230 may include a halo portion 230a that serves as a baffle and captures the light output of bias light 205 and directs it towards the user via opening 250 between the leading edge of the halo 230a and the edge of the display 200. In the embodiment illustrated in FIG. 2B, the edge of the display 200 is defined by edge cover 240 to which the screen 225 is affixed and which serves to secure the screen 225 to the inner cover 210. As described in additional detail with regard to FIG. 2C, the opening 250 may be adjusted through bending or rotating the halo 230a at locations such as 255a-b that join segments of a multi-segment halo. In some embodiments, a multi-segment halo 230a may be constructed from plastic segments that may be rotated relative to one another through manipulation of hinges or other articulation mechanisms that connect the panels. In some embodiments, the hinges connecting segments of the halo 230a may include detents that serve to define distinct configurations of the segments of the halo 230a. Via such adjustments to the segments of halo 230a, the characteristics of the output of bias light 205 may be adjusted according to the preferences of a particular user, while utilizing only the surfaces of the halo 230a itself to redirect the output of bias light 205, thus allowing a manufacturer of display 200 to still support reliable tuning of the operation of bias light 205.

In the illustrated configuration, the halo 230a is configured such that the redirected output of bias light 205 is reflected towards the user facing the screen 225. In other configurations, the halo 230a may be adjusted in order to widen or narrow the output of the bias light 205 that is emitted from the halo 230a. In other configurations, the joints 255a-b between segments of halo 230a may be adjusted in a more open configuration such that the bias light 205 output may be redirected into more widely into the room in which the display 200 is located, thus providing use of the bias light 205 output as ambient or decorative lighting. In other configurations, the joints 255a-b between segments of halo 230a may be adjusted in a more closed configuration such that the output of bias light 205 is redirected into a narrower beam directed towards a user facing screen 225.

In conventional bias displays, a rear cover is often fixed to its inner cover via a frame. As illustrated in FIG. 2B, however, the rear cover 230, according to some embodiments, may be fixed to the inner cover via a hook portion 260 that is received by an opening 265 in the inner cover 210. As illustrated, the hook 260 of the rear cover 230 and the corresponding opening 265 of the inner cover 210 are located further from the edge of the display 200 than the bias light 205 such that bias light 205 may be positioned along the edge of the display 200. By locating the hook 260 attachment of the rear cover 230 in this manner, the bias lights 205 may be positioned distal to the edge of the display while the halo portion 230a wraps around the edge of the display and extends from an attachment at a distal location from the edge. Configured in this manner, the halo 230a is positioned to capture and redirect the full output of bias light 205 while advantageously supporting positioning of the bias light 205 proximal to the edge of the display 200.

Figure 2C:
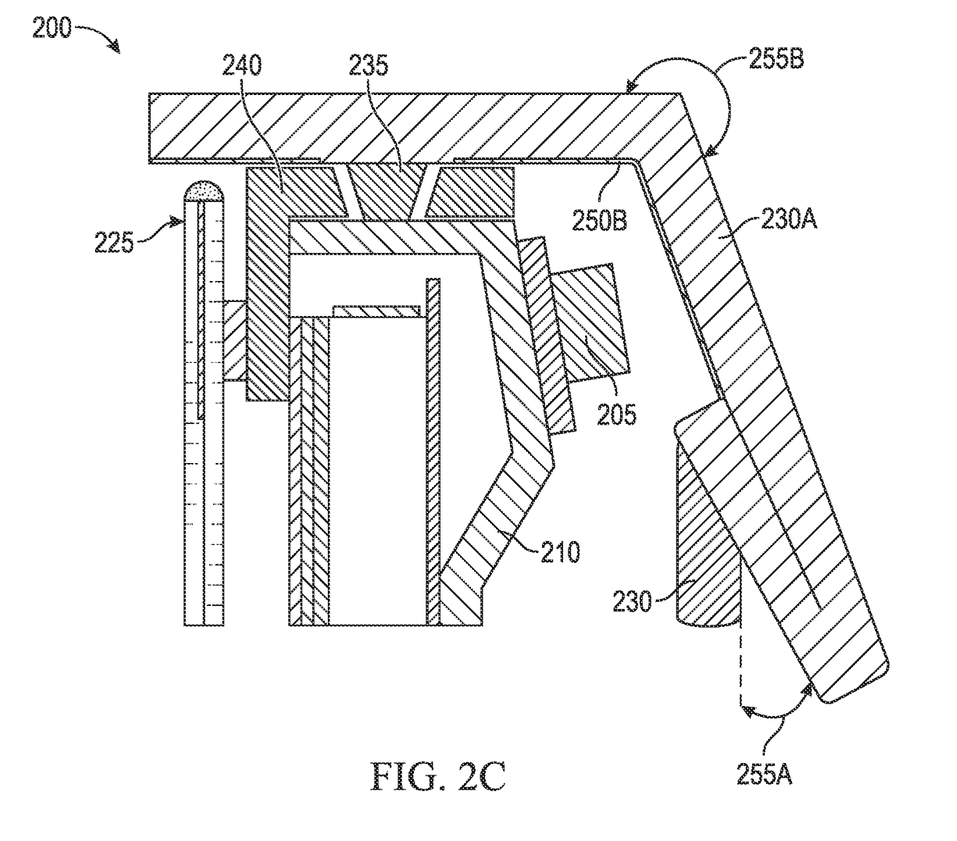
FIG. 2C is a cut-away illustration of a portion of a display that supports adjustable bias lighting via adjustment of a halo according to embodiments, where the halo is adjusted in a closed position.

FIG. 2C is a cut-away illustration of a portion of a display that supports adjustable bias lighting via configuration of a halo-type baffle according to embodiments, where the halo is adjusted in a closed position. As described above, the halo portion 230a of rear cover 230 may be adjusted to change the size of the opening between the halo 230a and the edge of the display 200. As the size of this opening gets smaller through adjustment of the halo 230a, the output of bias light 205 is directed outwards in a narrower beam, thus changing the characteristics of the bias light from the perspective of the user facing screen 225. As illustrated in FIG. 2C, the halo 230a may be configured such that the opening between the halo 230a and the edge of the display 200 is in a closed position. In certain embodiments, the halo 230a may be secured in a closed position through a magnet 235 that is fixed to the halo 230a and attaches to the metal inner cover 210 such that halo 230a is secured against the edge of the display 200. In certain embodiments, the IHS coupled to display 200 may be configured to detect the configuration of the halo 230a in a closed position and to disable the output of bias light 205 while the halo 230a remains in this closed position.

Figure 3A:
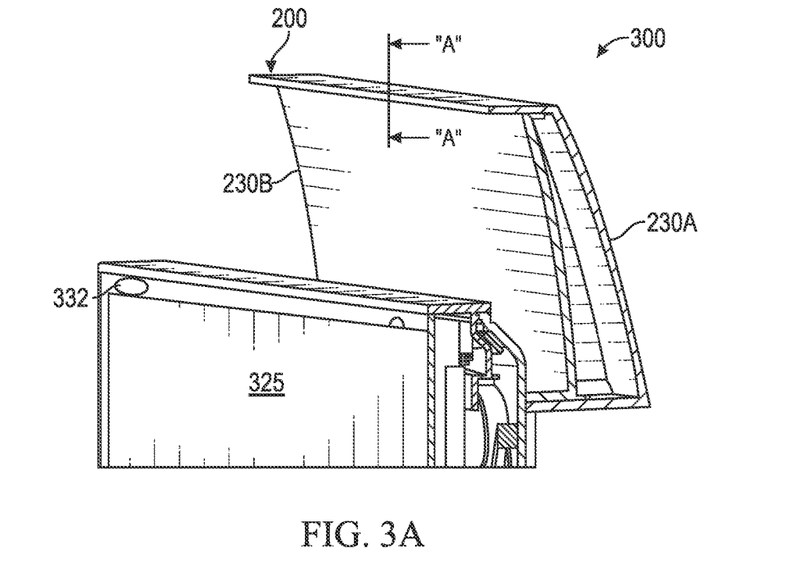
Figure 3B:
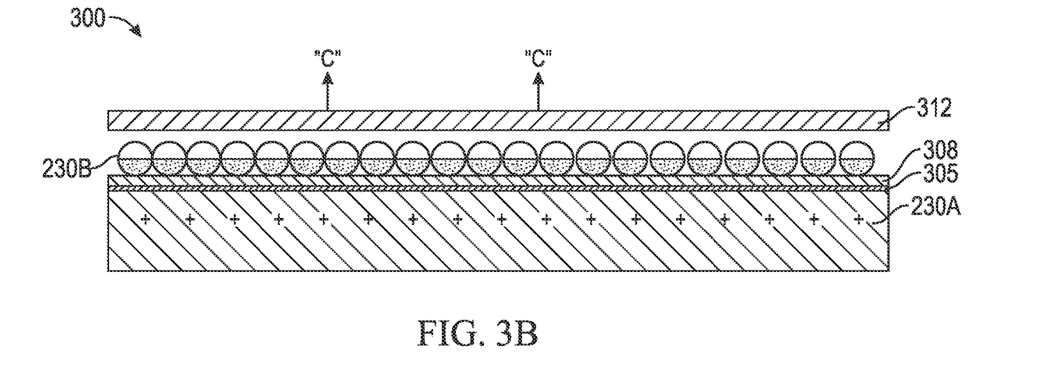
Figure 3C:
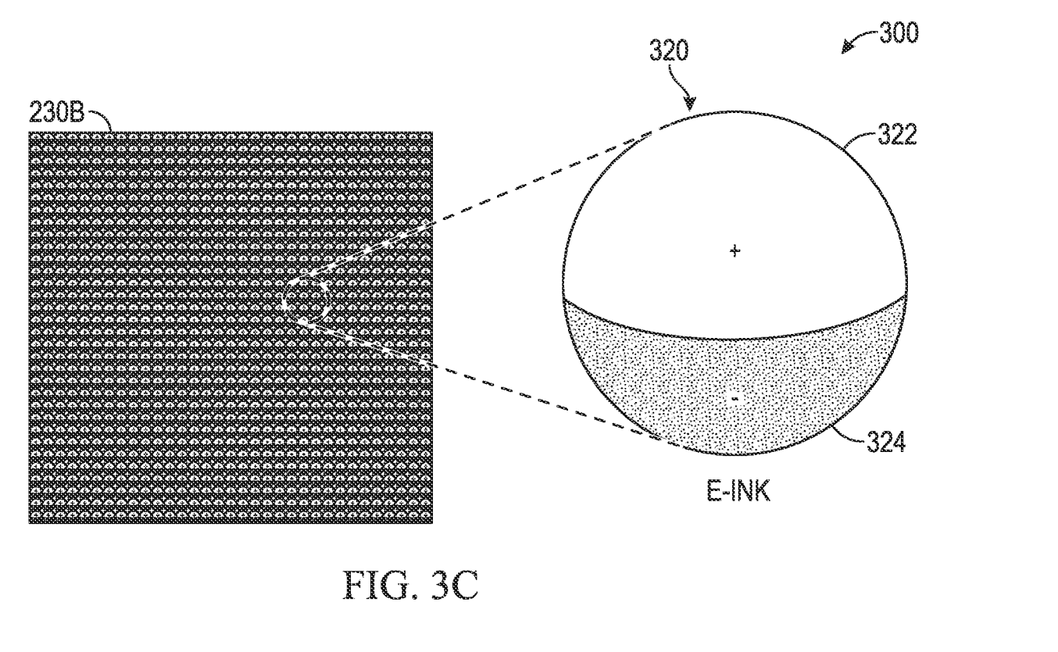
Figure 4A:
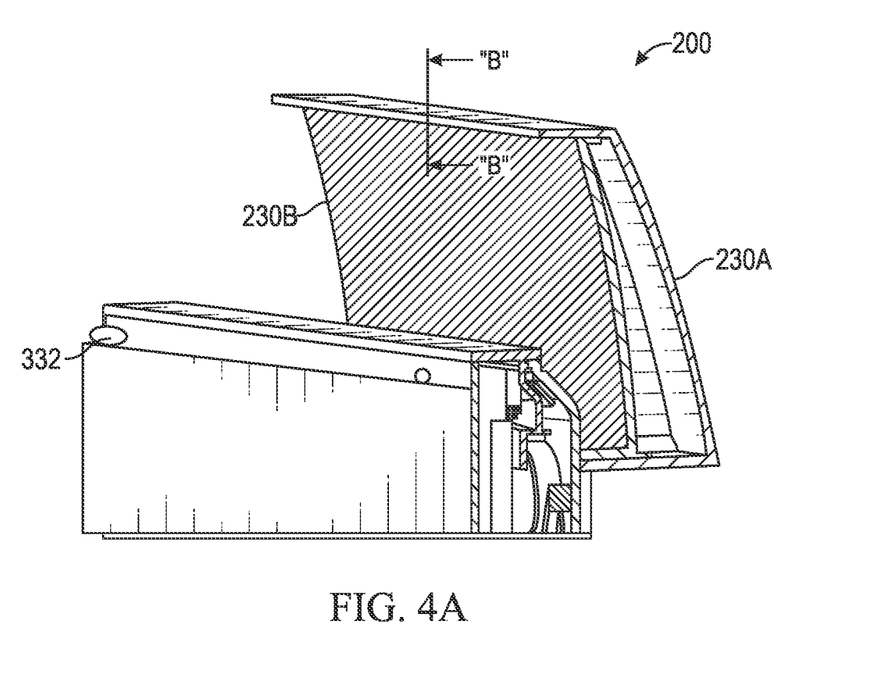
Figure 4B:
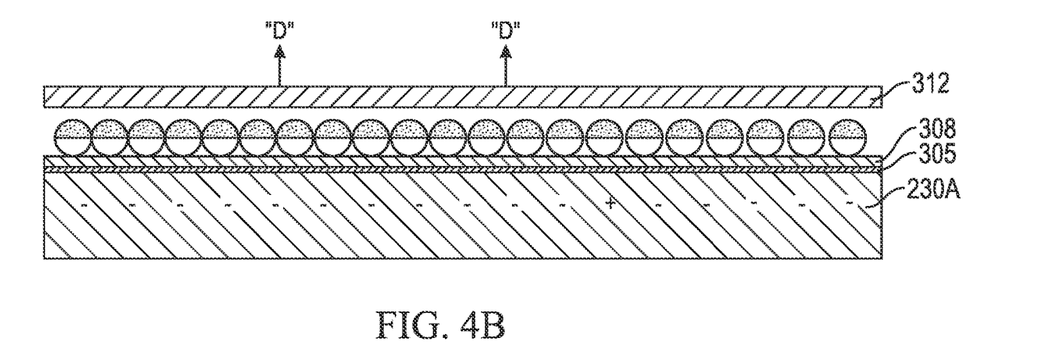
Figure 4C:
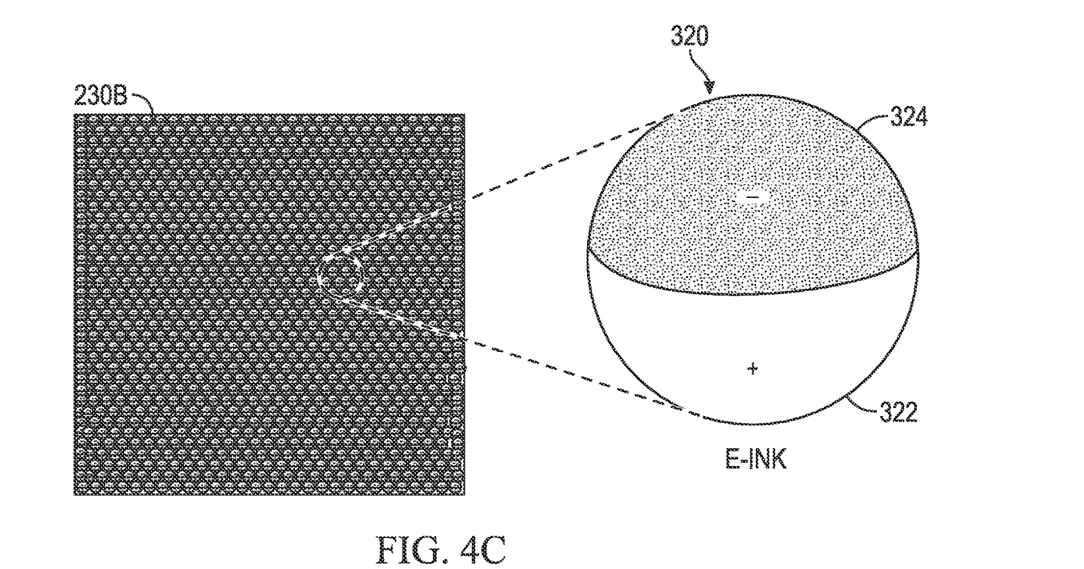

FIGS. 3A-4C illustrate how the display 200 of FIGS. 2A-2C may selectively adjust the amount of light reflected from the bias lights 205 according to one embodiment of the present disclosure. In particular, FIGS. 3A-3C illustrate how the inner surface of the halo 230 may be controlled to have a relatively reflective (e.g., white) surface for maximizing the amount of light reflected from the bias lights 205, while FIGS. 4A-4C illustrate how the inner surface of the halo 230 may be controlled to have a relatively non-reflective (e.g., black) surface for maximizing the amount of light reflected from the bias lights 205.

FIGS. 3A and 4A are partial perspective views of the halo 230a configured on its inner surface in which the selectively reflective layer 330b has a reflective surface and a non-reflective surface, respectively. The selectively reflective layer 230b may be created from any material that can be controlled to vary its relative surface reflectivity. In one embodiment, the selectively reflective layer 230a may be formed from a layer of electronic paper that may also be referred to as electronic ink (e.g., e-ink). Electronic paper may be particularly beneficial in that it is relatively inexpensive cost-wise, it is relatively thin and lightweight, and can be controlled using low power levels. Nevertheless in other embodiments, it is contemplated that the selectively reflective layer 230b may be created from any material that can be controlled to vary its level of surface reflectivity.

FIGS. 3B and 4B illustrate enlarged partial profile views of the halo 230a and selectively reflective layer 230b combination taken along the lines a-a and b-b as shown in FIGS. 3A and 4A, respectively. As shown, the selectively reflective layer 230b is affixed to the halo 230a using a layer of Optically Clear Adhesive (OCA) and/or Optically Clear Resin (OCR) 305. The selectively reflective layer 230b may be configured with a layer of micro particles 320, a transparent electrode layer 312 and a bottom electrode layer 308.

FIGS. 3C and 4C illustrate further enlarged plan views of a portion of the selectively reflective layer 230b taken along the lines c-c and d-d as shown in FIGS. 3B and 4B, respectively. FIGS. 3C and 4C show a further enlarged layer of micro particles 320 with a white colored positive dipole end 322 and a black colored negative dipole end 324. The micro particles 320 may be suspended in a layer of liquid polymer such that, when the transparent electrode layer 312 is negatively charged relative to the bottom electrode layer 208, the white dipole ends 322 of the micro particles 320 migrate toward the transparent electrode layer 312. Conversely, when the transparent electrode layer 312 is positively charged relative to the bottom electrode layer 208, the black dipole ends 324 of the micro particles 320 migrate toward the transparent electrode layer 312. Thus, the selectively reflective layer 230b may have a surface whose color changes between white and black based upon the relative charge placed on the transparent electrode layer 312 and the bottom electrode layer 308. Additionally, because the white color is more reflective than the black color, the white surface of the selectively reflective layer 230b will reflect more of the light emanating from the bias lights 205 than a black surface generated by the selectively reflective layer 230b. While the selectively reflective layer 230b is described with micro particles 320 having white and black dipole ends, it should be appreciated that the selectively reflective layer 230b may be implemented with micro particles having any color that changes its reflectivity based upon the charge placed on the transparent electrode layer 312 and the bottom electrode layer 308. For example, the selectively reflective layer 230b may be implemented with micro particles 320 having a light blue positive dipole end and a dark red negative dipole end.

In one embodiment, the display 200 may be configured with computer-executable logic that is stored in a memory of the display 200 and executed by a processor of the display 200 to automatically change the reflectivity of the selectively reflective layer 230b based upon ambient light conditions. Implementation of the computer-executable logic in the display 200 may be beneficial in that its use for controlling the reflectivity of the selectively reflective layer 230b may be provided independently of which IHS 100 it is coupled to. In another embodiment, the IHS 100 may be configured with computer-executable logic that is stored in the system memory 105 and executed by the processor(s) 101 to automatically change the reflectivity of the selectively reflective layer 230b based upon ambient light conditions.

For example, the display 200 may be configured with an ambient light sensor 332 that the computer-executable logic uses to detect an amount of ambient light around the display 200 such that, when the level of ambient light goes below a predetermined threshold level, cause the selectively reflective layer 230b to have a white color for maximizing the reflectivity of the selectively reflective layer 230b, and when the level of ambient light goes above another predetermined threshold level, cause the selectively reflective layer 230b to have a black color for minimizing the reflectivity of the selectively reflective layer 230b. As shown, the ambient light sensor 332 is configured on the front surface of the screen 225. In other embodiments, the ambient light sensor 332 may be configured externally relative to the display 200. For example, the ambient light sensor 332 may be configured on the surface of a housing of the IHS 100.

In one embodiment, the computer-executable logic may be configured to proportionally set the reflectivity level of the selectively reflective layer 230b according to the ambient light conditions detected by the ambient light sensor 332. For example, the computer-executable logic may set the selectively reflective layer 230b to have varying shades of gray based upon ambient light conditions that can range between totally dark and totally light.

In another embodiment, the computer-executable logic may be configured to receive manual input for setting the reflectivity of the selectively reflective layer 230b. For example, the computer-executable logic may, upon a triggering event (e.g., hot key press), display a slider bar that allows the user of the display 200 to manually select a proportional reflectivity level of the selectively reflective layer 230b. As another example, the computer-executable logic may display a user input window to receive user selected values for the threshold levels used to make the selectively reflective layer 230b reflective or non-reflective.

Figure 5:
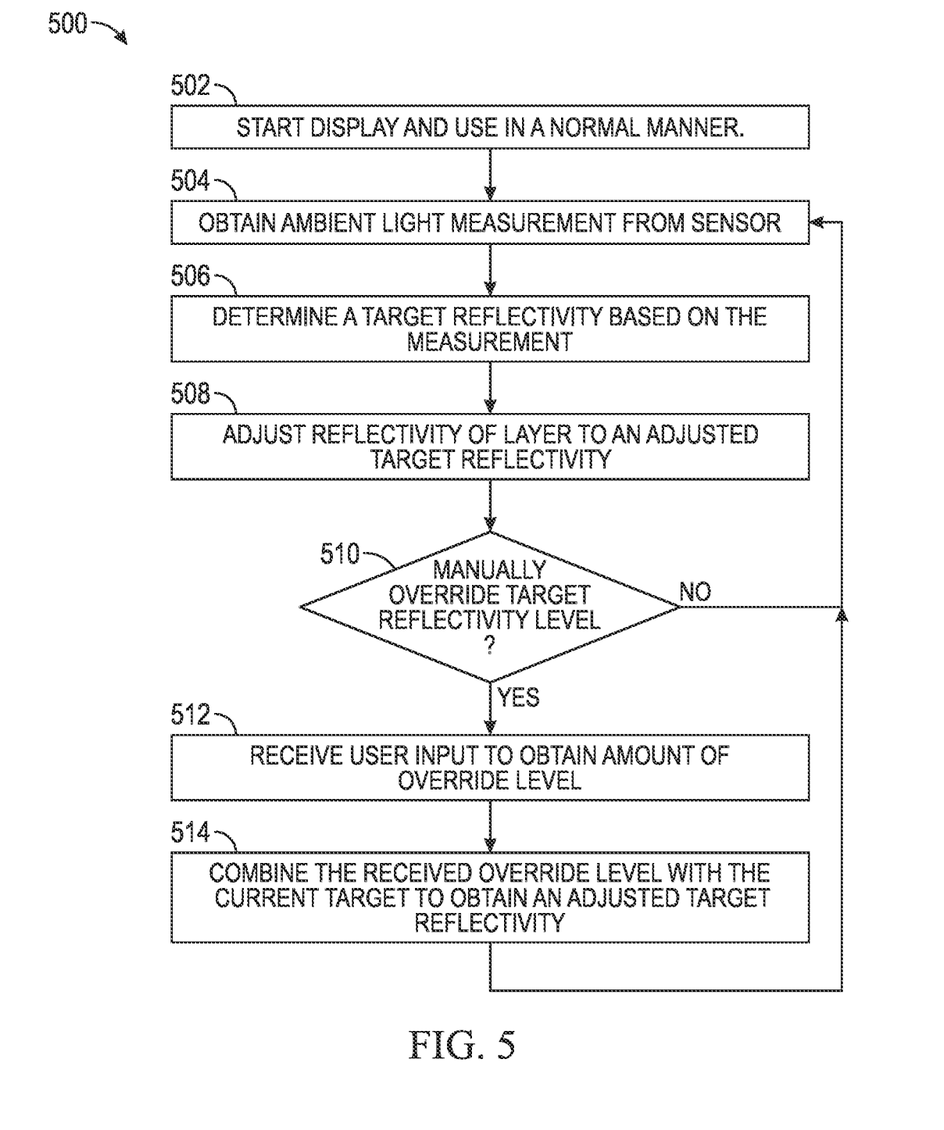
FIG. 5 illustrates an example adjustable light emitting method for bias lighting according to one embodiment of the present disclosure.

FIG. 5 illustrates an example adjustable light emitting method 500 for bias lighting according to one embodiment of the present disclosure. Additionally or alternatively, the adjustable light emitting method 500 may be performed at least in part, using instructions stored in at least one memory and executed by one or more processors. In one embodiment, the memory and the processors may be configured in the display. In another embodiment, the memory and processors may be those used in an IHS to which the display is coupled to. The adjustable light emitting method 500 may be performed at any suitable time, such as continually as the display is being used.

Initially at step 502, the display is started and used in a normal manner. Thereafter at step 504, the method 500 obtains an ambient light measurement from the ambient light sensor 332. In one embodiment, the method 500 may obtain the ambient light measurement at ongoing intervals, such as periodically (e.g., every 5 to 20 seconds). The method 500 may then determine a target reflectivity based on the measurement at step 506. In one embodiment in which the selectively reflective layer 230b is controlled to be either black or white, the method 500 may compare the measurement against upper and lower threshold values to determine whether to control the selectively reflective layer 230b to be either white or black. In another embodiment in which the selectively reflective layer 230b is controlled to be inversely proportional to the ambient light measurement, the target reflectivity of the selectively reflective layer 230b may be set to a fractional value between minimally reflective and maximally reflective. The method 500 then, at step 508, adjusts the reflectivity of selectively reflective layer 230b to the target reflectivity. For example, the method 500 may control a charge level or voltage level placed across the selectively reflective layer 230b so that the reflectivity of the selectively reflective layer 230b reflects the bias lights at the target reflectivity level. In one embodiment in which the target reflectivity level is manually overridden, the method 500 adjusts the reflectivity of selectively reflective layer 230b to an adjusted target reflectivity as will be described in detail herein below.

At step 510, the method 500 determines whether the target reflectivity level is to be manually overridden. If not, processing continues at step 504 to again control the reflectivity of the selectively reflective layer 230b based on the measured ambient light conditions; otherwise, processing continues at step 512 in which the method receives user input to obtain an amount of override level. In one embodiment in which the selectively reflective layer 230b is controlled to be either black or white, the user may select a proportional amount of the upper and lower threshold levels that will be used to either select the black or white reflectivity levels. In another embodiment in which the selectively reflective layer 230b is controlled to be inversely proportional to the ambient light measurement, the user may select a fractional value in which the reflectivity is either to be increased or decreased. At step 514, the method 500 combines the obtained override level with the target reflectivity level to obtain an adjusted target reflectivity level. For example, if the selectively reflective layer 230b is either to be black or white, the method 500 may compare the target reflectivity level with the received threshold levels from the user to determine whether to set the selectively reflective layer 230b to either black or white. For another example, if the selectively reflective layer 230b is controlled to have a proportional reflectivity level, the method 500 may sum the received override level with the target reflectivity level to obtain the adjusted reflectivity level. At this point, the method 500 may continue processing at step 504 to again adjust the reflectivity level of the selectively reflective layer 230b.

The aforedescribed adjustable light emitting method 500 may be performed continually as the display 200 is being used to adjust the reflectivity of the selectively reflective layer 230b according to measured ambient light conditions and according to user input. Nevertheless, when its use is no longer needed or desired, the method 500 ends.

Although FIG. 5 describes an example method 500 that may be performed to prevent firmware from being cloned on rogue devices, the features of the method 500 may be embodied in other specific forms without deviating from the spirit and scope of the present disclosure. For example, the method 500 may perform additional, fewer, or different operations than those described in the present examples. For another example, the method 500 may be performed in a sequence of steps different from that described above. As yet another example, certain steps of the method 500 may be performed by other components than those described above, such as by a Baseboard Management Controller (BMC) configured in the IHS 100.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A display for presenting information generated by an Information Handling System (IHS), the display comprising:
   a screen disposed on a front side of the display;
   one or more bias lights disposed on a rear side of the display;
   a baffle comprising a baffle surface, the baffle coupled to the rear side of the display and extending around an outer edge of the display; and
   a selectively reflective layer disposed on the baffle surface, wherein the selectively reflective layer has a reflectivity that is changeable to selectively reflect a varying amount of light outputted from the bias lights, wherein the selectively reflective layer comprises an electronic paper material, and wherein the electronic paper material is configured to be controlled to generate a shade of color inversely proportional to an amount of ambient light around the display.

2. The display of claim 1, wherein the electronic paper material is configured to be controlled to generate a black or a white surface.

3. The display of claim 1, further comprising an Ambient Light Sensor (ALS) that is configured to detect the amount of ambient light around the display.

4. The display of claim 3, wherein the ALS is configured on a surface of the display.

5. The display of claim 3, wherein the ALS is configured external to the display.

6. The display of claim 1, wherein the electronic paper material is attached to the baffle using an Optically Clear Adhesive (OCA) or an Optically Clear Resin (OCR).

7. An adjustable light emitting halo system for display bias lighting, the adjustable light emitting halo system comprising:
   a processing device comprising one or more processors and one or more memory units including instructions that, upon execution by the processors, cause an Information Handling System (IHS) to:
   receive a signal indicating an amount of ambient light around a display comprising a screen disposed on a front side of the display, one or more bias lights disposed on a rear side of the display, and a baffle comprising a baffle surface and coupled to the rear side of the display; and
   control a selectively reflective layer disposed on the baffle surface to selectively vary a reflectivity of the selectively reflective layer based upon the received signal.

8. The adjustable light emitting halo system of claim 7, wherein the instructions, upon execution, cause the processing device to control an electronic paper material to vary its reflectivity according to the received signal.

9. The adjustable light emitting halo system of claim 7, wherein the instructions, upon execution, cause the processing device to receive the signal from an Ambient Light Sensor (ALS) configured on the display.

10. The adjustable light emitting halo system of claim 7, wherein the instructions, upon execution, cause the processing device to receive user input for manually setting the reflectivity of the selectively reflective layer.

11. The adjustable light emitting halo system of claim 7, wherein the processing device and the one or more memory units are configured in the display.

12. The adjustable light emitting halo system of claim 7, wherein the processing device and the one or more memory units are configured in an Information Handling System (IHS) that is coupled to the display.

13. An adjustable light emitting halo method comprising:
   receiving a signal indicating an amount of ambient light around a display comprising a screen disposed on a front side of the display, one or more bias lights disposed on a rear side of the display, and a baffle comprising a baffle surface and coupled to the rear side of the display; and
   controlling a selectively reflective layer disposed on the baffle surface to selectively vary a reflectivity of the selectively reflective layer based upon the received signal.

14. The adjustable light emitting halo method of claim 13, further comprising controlling an electronic paper material to vary its reflectivity according to the received signal.

15. The adjustable light emitting halo method of claim 13, further comprising controlling the selectively reflective layer to vary its reflectivity inversely proportionally according to the received signal.

16. The adjustable light emitting halo method of claim 13, further comprising receiving the signal from an Ambient Light Sensor (ALS) configured on the display.

17. The adjustable light emitting halo method of claim 13, further comprising receiving user input for manually setting the reflectivity of the selectively reflective layer.

* * * * *